(12) United States Patent
Silies et al.

(10) Patent No.: US 11,485,434 B2
(45) Date of Patent: Nov. 1, 2022

(54) HARVESTER AND METHOD FOR HARVESTING USING A HARVESTER

(71) Applicant: CLAAS Selbstfahrende Erntemaschinen GmbH, Harsewinkel (DE)

(72) Inventors: Andreas Silies, Emsbüren (DE); Sascha Rackow, Paderborn (DE); Wolfgang Meier, Lichtenau (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 432 days.

(21) Appl. No.: 16/792,460

(22) Filed: Feb. 17, 2020

(65) Prior Publication Data
US 2020/0269938 A1 Aug. 27, 2020

(30) Foreign Application Priority Data

Feb. 27, 2019 (DE) .................. DE 102019104953.9

(51) Int. Cl.
*B62D 55/12* (2006.01)
*B62D 11/24* (2006.01)
(Continued)

(52) U.S. Cl.
CPC ............ *B62D 55/112* (2013.01); *B62D 11/24* (2013.01); *B62D 55/02* (2013.01); *B62D 55/10* (2013.01); *A01D 41/127* (2013.01)

(58) Field of Classification Search
CPC ..... A01B 69/007; A01B 41/127; A01B 67/00; B62D 11/24; B62D 55/02; B62D 55/10; B62D 55/112; B62D 9/00
See application file for complete search history.

(56) References Cited

U.S. PATENT DOCUMENTS 3,774,708 A * 11/1973 Purcell .................. B62D 55/10
305/155
5,191,952 A   3/1993 Satzler et al.
(Continued)

FOREIGN PATENT DOCUMENTS

DE     102011114536 A1    4/2013
GB         2393696 A      4/2004

OTHER PUBLICATIONS

European search report for European application No. 19209699.8-1004 dated Aug. 11, 2020.

*Primary Examiner* — Tyler J Lee
(74) *Attorney, Agent, or Firm* — Lempia Summerfield Katz LLC

(57) ABSTRACT

A harvester and a method for harvesting a crop is disclosed. The harvester includes two track drives positioned on opposite ends of a front axle of the harvester, each of the track drives including two main wheels that are arranged successively in the driving direction of the harvester, at least one auxiliary wheel positioned between the main wheels, and at least one track that surrounds the main wheels. The auxiliary wheel can interact with a bottom section of the track so that the forces to be deflected via the particular track drive into ground can be deflected at least proportionately using the auxiliary wheel. To reduce the shearing forces into the ground when the harvester turns, a control unit, depending on the steering angle of the harvester, controls a lifting unit to lift a front main wheel of a particular track drive from its home position to a lifted position.

20 Claims, 4 Drawing Sheets

(51) Int. Cl.
*B62D 55/02* (2006.01)
*B62D 55/10* (2006.01)
*A01D 41/12* (2006.01)
*B62D 55/112* (2006.01)
 A01D 41/127 (2006.01)

(56) References Cited

U.S. PATENT DOCUMENTS

| | | | | |
|---|---|---|---|---|
| 5,339,611 | A * | 8/1994 | Roderfeld | B60G 5/00 |
| | | | | 180/209 |
| 5,566,773 | A * | 10/1996 | Gersmann | B62D 55/12 |
| | | | | 180/9.5 |
| 5,997,109 | A * | 12/1999 | Kautsch | B62D 55/305 |
| | | | | 305/128 |
| 6,033,044 | A * | 3/2000 | Brinkrolf | B62D 55/12 |
| | | | | 305/195 |
| 7,200,981 | B2 * | 4/2007 | Heidjann | A01D 41/12 |
| | | | | 56/14.7 |
| 7,628,235 | B2 | 12/2009 | Satzler | |
| 8,341,926 | B2 * | 1/2013 | Speckamp | B62D 55/116 |
| | | | | 180/9.5 |
| 8,348,001 | B2 | 1/2013 | Isfort | |
| 9,415,818 | B1 * | 8/2016 | Tiede | B62D 55/10 |
| 9,434,427 | B1 * | 9/2016 | Tiede | B62D 55/0842 |
| 10,266,217 | B2 * | 4/2019 | Gustafson | B62D 55/112 |
| 2003/0000194 | A1 * | 1/2003 | Heidjann | A01D 41/12 |
| | | | | 56/14.7 |
| 2013/0226382 | A1 * | 8/2013 | Grossman | B62D 55/084 |
| | | | | 29/426.6 |
| 2016/0332681 | A1 | 11/2016 | Missotten et al. | |

* cited by examiner

HARVESTER AND METHOD FOR HARVESTING USING A HARVESTER

CROSS REFERENCE TO RELATED APPLICATION

This application claims priority under 35 U.S.C. § 119 to German Patent Application No. DE 102019104953.9 (filed Feb. 27, 2019), the entire disclosure of which is hereby incorporated by reference herein.

TECHNICAL FIELD

The present application relates to a harvester equipped with track drives for harvesting a crop in a work field. The harvester can in particular be formed by a forage harvester. Moreover, the present application comprises a method for processing a work field by means of a harvester equipped with track drives.

BACKGROUND

The harvester comprises at least two track drives that interact with the front axle of the harvester. The track drives are each arranged on opposite sides of the harvester. They each comprise two main wheels (idler wheels) arranged sequentially (e.g., serially or in series) in the direction of travel of the harvester, as well as at least one auxiliary wheel (midroller) between the main wheels. The main wheels are surrounded by a revolving track by means of which the track drives roll on the ground. At least one of the main wheels can be driven so that a drive torque can be transmitted via the main wheel to the track, and the harvester can be moved thereby relative to the ground. The auxiliary wheel serves to increase the contact area of the particular track drive to minimize surface pressure on the ground. The auxiliary wheel typically has a much smaller diameter than the main wheels. To enable transmission of force into the ground via the auxiliary wheel, the latter interacts with a bottom section of the track which is in direct contact with the ground.

Harvesters and methods are disclosed in U.S. Pat. Nos. 7,628,235 and 8,348,001, both of which are incorporated by reference herein in their entirety. These each disclose track drives that are suitable for use on a harvester. In particular, U.S. Pat. No. 8,348,001 discloses a track drive that is arranged on a field harvester. Additionally, German patent application DE 10 2011 114 536 A1, incorporated by reference herein in its entirety, discloses a track drive for a harvester.

DESCRIPTION OF THE FIGURES

The present application is further described in the detailed description which follows, in reference to the noted plurality of drawings by way of non-limiting examples of exemplary implementation, in which like reference numerals represent similar parts throughout the several views of the drawings, and wherein.

DETAILED DESCRIPTION

Figure 1:
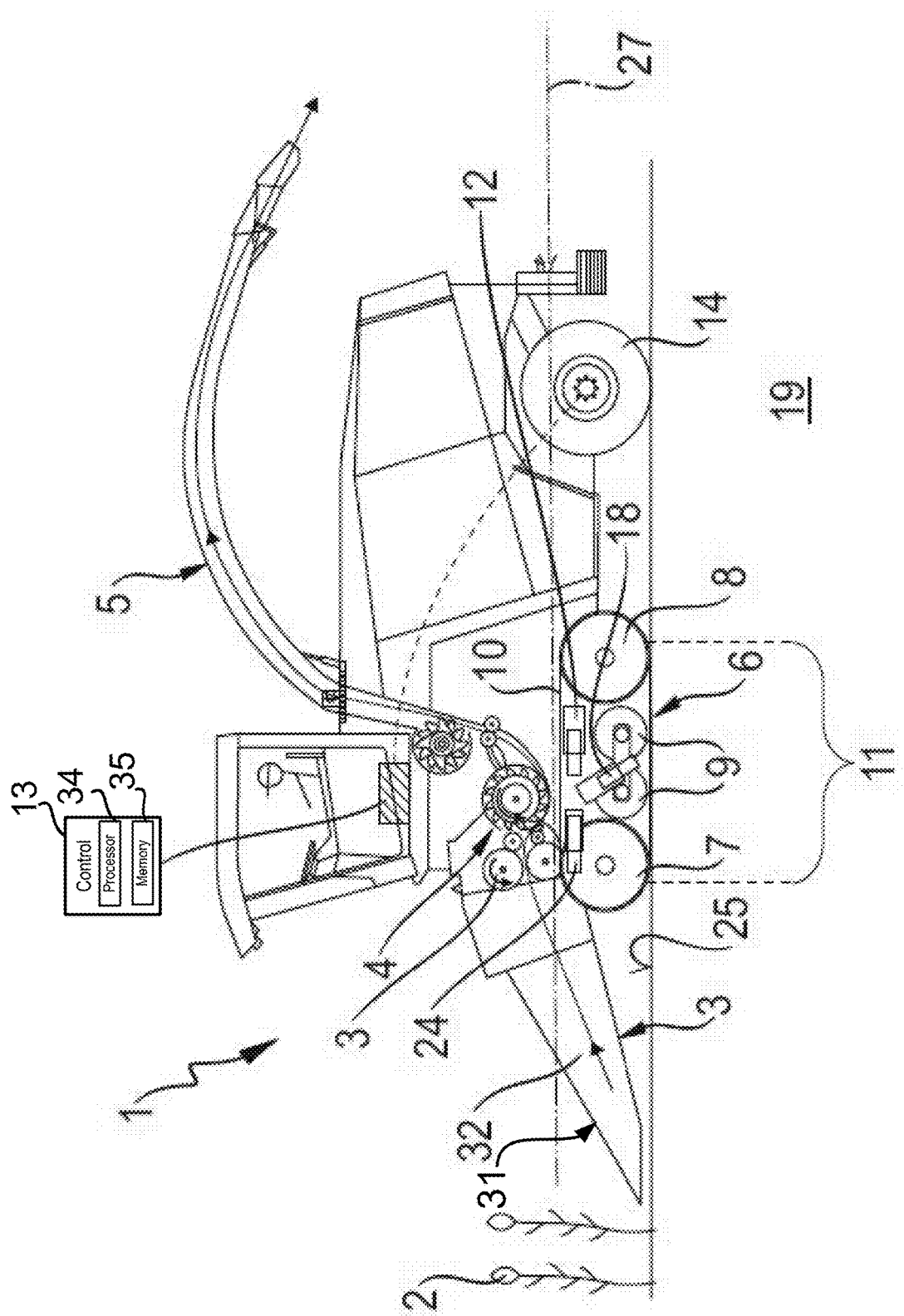
FIG. 1 is a partial cross-section of a harvester according to the invention with a track drive in its home position.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

As discussed in the background, particularly when harvesting grass, turning maneuvers may cause significant damage to the turf in the headland of a work area when using track drives on a harvester, which occurs from strong shearing forces by the track of the track drives on the ground. This is because the track contacts a comparatively large surface of the ground, with this surface being guided along the curve over the ground during the turning maneuver, thereby causing the turf to be sheared relative to the ground.

Consequently, in one or some embodiments, a harvester is disclosed whereby shearing forces applied to the ground are reduced at least partly while executing a turning maneuver. This may be accomplished by using one or more lifting units. In particular, the harvester may include at least one lifting unit on its track drives through which at least the front of the two main wheels of the particular track drive may be moved or transferred into a lifted position (e.g., moving the front main wheel(s) starting from a home position (which is the position for normal operation) to a lifted position). The home position may be defined such that, when it the front main wheel(s) are in the home position, the front main wheel(s) may transmit forces of the harvester via the track to the work field. In other words, the track drive stands indirectly on the field via the front main wheel. When the front main wheel is in its lifted position, it is contrastingly at least partly lifted off of the work field such that a contact surface of the track in contact with the surface of the work field is reduced in comparison to a situation in which the front main wheel is in its home position (e.g., there is a greater amount of the surface of the front main wheel(s) contacting the ground when the front main wheel(s) are in the home position versus a lesser amount of the surface of the front main wheel(s) contacting the ground when the front main wheel(s) are in the lifted position). In this regard, lifting the front main wheel reduces a contact surface of the track that contacts with the particular surface of the field versus a contact surface of the track in the home position (e.g., a total area that the front main wheel(s) contacts the ground is less when the front main wheel(s) are in the lifted position versus a total area the front main wheel(s) contacts the ground is less when the front main wheel(s) are in the home position).

In one or some embodiments, only a single lifting unit is used. The advantage of this is that the movement of the lifting unit occurs faster than if several lifting units would have to be operated. This holds true in particular when a plurality of lifting units are operated by means of a common hydraulic system. Moreover, less working fluid (typically hydraulic fluid) may be required when using a hydraulic system to drive the lifting unit in order to supply the force to lift the front main wheel(s). Given the weights to be moved, the use of only one lifting unit may be problematic.

Therefore, in one or some embodiments, greater than one lifting unit (such as at least two lifting units) may be used. The use of more than two lifting units is also contemplated. If there are a plurality of lifting units, it is contemplated and possibly advantageous to only use one lifting unit to lift the front main wheel while the other lifting units are inactive. This may, for example, be implemented by the other lifting units not changing their position (e.g., either completely inactive or maintain the current position of the other lifting units) while the one sole lifting unit lifts the front main wheel.

Moreover, in one or some embodiments, the harvester comprises at least one control device through which to control the lifting unit (and in turn the lifting of the front main wheel). Various types of control are contemplated. As one example, the control device is configured to automatically initiate control of the lifting unit responsive to one or more inputs, such as responsive to data indicative of a steering angle of the harvester. Steering angle may be measured in one or more ways. For example, in one way, the steering angle may be measured depending on a position of a steering wheel of the harvester. In this regard, the control device may be in communication with one or more parts of the harvester that may generate data indicative of the steering angle (e.g., the control device is in communication with electronics associated with the steering wheel in order for the control device to receive from the electronics associated with the steering wheel the data indicative of the steering angle). A "steering wheel" within the meaning of the present invention may comprise at least one wheel of the harvester through which the harvester may be forced or guided into cornering on the work field. Typically, the two wheels positioned on the particular rear axle of the harvester, which are generally designed in the form of typical round tires, are designed as steering wheels that can be pivoted about an at least substantially vertical steering axle relative to the remaining harvester.

With regard to a track drive, one advantage over a typical wheel is that the contact surface between the harvester and the particular ground may be significantly increased when using a track drive. Surface pressure between the track of the track drive and the ground is thereby substantially reduced in comparison to the surface pressure between a contact surface of a wheel and the ground. Consequently, using a track drive both reduces damage to the ground and improve suitability of using the harvester on less supportive ground (e.g., a relatively marshy area). In one or some embodiments, the track drive may include one or more auxiliary wheels. In particular, at least one auxiliary wheel, and optionally a plurality of auxiliary wheels, may serve to hold the bottom section of the track continuously (or nearly continuously) in contact with the ground (e.g., to prevent the track from lifting for example in a region of uneven ground).

In one or some embodiments, the harvester has several advantages. In particular, the at least one lifting unit (via control from the control device) is configured to automatically lift the front main wheel of at least one track drive (e.g., lift the front main wheel of only one of the track drives, or alternatively, lift the front main wheel of each of the track drives) off of the field at least partly while executing a turning maneuver in the region of a headland of the field. The control device may automatically configure this lifting process (via control of the listing unit) so that no additional intervention by an operator of the harvester is necessary. In this regard, in one or some embodiments, the control device controls the lifting unit wholly automatically (without any input by the operator after initial configuration of the control device to perform the automatic control). For example, the operator may cause (either manually, semi-automatically or fully automatically) execution of particular turning maneuver. In turn, during the turning maneuver, the control device, which may monitor the steering angle, may determine that a current steering angle of the harvester (as indicated by data indicative of the steering angle) is greater than a predetermined steering angle limit of the harvester. Responsive to the control device determining that the current steering angle of the harvester is greater than a predetermined steering angle limit, the control device may automatically (at least indirectly) actuate the lifting unit of the particular track drive, thereby causing the front main wheel to be moved from its home position into its lifted position. Finally, the lifting causes the contact surface between the track and the surface of the work field to be reduced, which significantly reduces the shearing forces on the part of the track drive or the associated track applied to the field during the turning maneuver. As a result, the turning maneuver to be executed at the end of a particular working strip may therefore be executed with much less damage to the field by using the harvester disclosed herein. In other words, by using the harvester according to one or some embodiments, no damage (or less damage), for example to turf of the field, can be expected in comparison to the damage expected when using a known harvester that is equipped with track drives.

In one or some embodiments, the at least one lifting unit is in an extended position when the front main wheel is in its home position, and in a retracted position when the front main wheel is in its lifted position. This particular occurs when the lifting unit comprises or is formed as a piston/cylinder unit, which can interact and be driven by a hydraulic system. Advantageously, the lifting unit may be aligned horizontally, at least substantially and optionally completely.

To the extent that the particular track drive comprises a plurality of lifting units, it is particularly advantageous when at least two lifting units, such as one, some or all lifting units, interact with a common hydraulic system. Such a hydraulic system typically comprises at least one hydraulic pump though which working fluid may be pumped and pressurized. In this case, the hydraulic pump is connected via hydraulic lines to the lifting unit, which may be formed as a piston/cylinder unit. When a plurality of lifting units are used, it may be advantageous if the individual lifting units interact with the common hydraulic system. In so doing, the lifting units may be connected to each other via hydraulic lines.

In one or some embodiments, to the extent that there are a plurality of lifting units that interact with a common hydraulic system, at least one lifting unit may at least be temporarily disconnected from the hydraulic system. In this manner, it is possible to operate only less than all of the lifting units (such as only one of the lifting units) at least temporarily by operating the hydraulic system, whereas the others may be inactive. This is particularly contemplated in the configuration where lifting the front main wheel is actuated by only one lifting unit, whereas at least one other lifting unit is disconnected from the hydraulic system, and the position of the disconnected other lifting unit does not change while the only one lifting unit lifts the front main wheel. In one or some embodiments, the control device, which controls the lifting unit to lift the front main wheel, may command disconnection of the at least one other lifting unit from the hydraulic system when commanding the lifting unit to lift the front main wheel.

In one or some embodiments, one, some, or all of the lifting units in the harvester may be independently controlled (and independently driven) by the common hydraulic system. In particular, at least one lifting unit may be activatable by the common hydraulic system while at least one, some, or all remaining lifting units are inactive.

In particular, depending on the design of the lifting units, it may be difficult to operate a particular lifting unit because of centrifugal forces that act during a turning maneuver when cornering the harvester, and a necessary level of force that would be required to overcome both the centrifugal forces as well as the particular weights may not be able to be applied. In such a case, the relevant lifting unit may be deactivated, such as disconnected from the common hydraulic system, and to have the single lifting unit exclusively apply the force to move the particular front main wheel between its home position and its lifted position. In one or some embodiments, those lifting units that may be oriented substantially vertically may be disconnected from the hydraulic system when the front main wheel is moved to its lifted position.

Moreover, in one or some embodiments, the harvesting machine (interchangeably referred to as a harvester) may include track drives, each of which may have a two-part frame, wherein one of the main wheels of a particular track drive is positioned or arranged on one frame part, and the other main wheel is positioned or arranged on the other frame part of the frame. Furthermore, the frame parts may be connected to each other in a manner so as to transmit force and are pivotable relative to each other about a pivot axle parallel to the front axle of the harvester. Pivoting the two frame parts relative to each other may be used to transfer the front main wheel of the track drive between its lifted position and its home position. Further, the pivot axle and the front axle may be arranged or positioned at a distance from each other. Such an arrangement of a particular track drive may be used in order to move at least the front main wheel in a vertical direction. It is contemplated to lift a particular front frame part that interacts with the front main wheel and pivot the front frame part about the pivot axle (which may define a pivot axis) relative to the other frame part. Such a movement may be accomplished by applying a tractive force vertically above the pivot axle (which defines the pivot axis), which may be performed by retracting the lifting unit (in the case where the lifting unit comprises a piston/cylinder unit).

In one or some embodiments, at least one of the lifting units is designed such that it is opposingly braced against two frame parts. That is, forces exerted by the lifting unit act in opposite directions on the two frame parts, which may at least support the pivoting and consequently the lifting of the front main wheel. In an example of an at least substantially horizontally oriented lifting unit that interacts with both frame parts, this means that a tractive force exerted on a frame part is analogously applied to the other frame part. In this way, lifting the front main wheel as disclosed herein may, in turn, affect a contact force of the rear main wheel. In particular, the rear main wheel may serve as a partial counter bearing for the lifting force exerted on the front main wheel. Consequently, a lifting force is also applied to the rear main wheel. This reduces the contact force of the rear main wheel on the ground, and, in turn, may reduce the shearing forces applied to the work field in the region of the rear main wheel. The vertical forces applied to the field by the particular track drive may further be shifted to the at least one auxiliary wheel in such a situation, with the at least one auxiliary wheel applies comparatively low shearing forces to the ground due to its small contact surface. This reduction of the contact force by the rear main wheel and/or this increase in the contact force by the auxiliary wheel may further reduce damage to the ground.

Moreover, in one or some embodiments, at least one lifting unit interacts with one of the frame parts and is braced against the at least one auxiliary wheel. Such a lifting unit may press or apply force to the particular frame part against the auxiliary wheel in a direction facing away from the ground (e.g., press upward). This causes the particular frame part to pivot relative to the other frame part and also lift the front main wheel. It is correspondingly understandable that the frame part with which the lifting unit interacts may be the one that is arranged on the front main wheel.

In one or some embodiments, the contact surface of the track may be reduced when the front main wheel is in its lifted position by at least 10%, by at least 20%, by at least 30%, in comparison to the contact surface when the front main wheel is in its home position. In turn, a track contact surface which is proportionately smaller leads to a proportionately smaller application of shearing forces to the particular ground.

In one or some embodiments, each of the harvester track drives comprises at least one damping element that interacts with at least one frame part of the particular track drive so that pivoting the particular frame part relative to the other frame part about the aforementioned pivot axle may be dampened using the damping element. Advantageously, the damping element may be formed by a lifting unit, wherein such a lifting unit may be active at least partly while lifting the front main wheel and then act as a damping element at least partly while subsequently lowering the front main wheel. In one or some embodiments, the lowering of the front main wheel does not necessarily have to be operated actively but may act passively, specifically lowering the front main wheel downward toward the field only under the effect of the weight of the front main wheel and the components lifted therewith. The at least one lifting unit may accordingly be used particularly well as the damping elements in a passive damping function. It is also contemplated to include a separate damping element.

In one or some embodiments, the at least one lifting unit, such as one, some or all of the lifting units, may be designed in the form of a piston/cylinder unit. In particular, one, some or all lifting units may be designed such that its piston may be actively extended out of the associated cylinder and actively retracted in the associated cylinder ("dual acting cylinder"). Such lifting units may be operated very effectively hydraulically and thereby overcome the significant weight of the front main wheel.

In one or some embodiments, a method for operating a harvester is disclosed. The method may comprise the following: depending on a steering angle of the harvester, at least one front main wheel of at least one of the track drives of the harvester is lifted off of a surface of the field so that a contact surface of a track of the track drive in contact with the surface is at least partially reduced; a "working strip" may comprise a part of the field to be processed using the harvester. A width of the working strip may correspond at least substantially to a working width of the harvester. Typically, the individual working strips of a field are oriented parallel to each other and are at least substantially straight. The field may be subdivided into a plurality of such working strips for more efficiently processing (e.g., harvesting) of the field.

The harvester may execute a turning maneuver in a headland of the field after finishing a particular working strip, such as one that typically occurs in an edge region of the particular field in order to then be able to process the next working strip. Typically, the individual working strips that are processed sequentially using the harvester are arranged directly adjacent to each other so that they have a common border. It is likewise contemplated that sequentially processed working strips are arranged at a distance from each other on the field in order to simplify the turning maneuver for the harvester. This can be advantageous if the harvester has a comparatively large turning circle relative to its working width, and thus to the width of the particular working strip. In addition to steering the harvester during the turning maneuver, steering movements may also be made in other maneuvers, and which, in turn, may also be advisable to lift at least the front main wheel in those other maneuvers.

One turning maneuver is typically executed in an edge region of the particular work field. This edge region provided for turning is termed the so-called "headland".

The method of performing steering (e.g., turning) maneuvers may be performed easily using the harvester as disclosed herein. In one or some embodiments, the method may help protect the surface of the particular field (e.g., turf) subject to processing by reducing the shearing forces while cornering the harvester, such as shearing forces caused by executing a turning maneuver, thereby at least partly reducing damage to the field.

Furthermore, the harvester may be operated in different areas separate from a field, such as on a public road. In this regard, reducing the contact surface, such as by lifting the front main wheel(s) of the track may be performed while driving on a public road. In this way, significant wear to the track, such as caused while moving the harvester on a road, may be significantly reduced. It is thus correspondingly advantageous to lift the front main wheel of the track drive depending on the type of use, such as when transferring or moving the harvester from one field to another field.

In one or some embodiments, the front main wheel is lifted using at least one lifting unit that may be formed by a piston/cylinder unit. It is contemplated to retract, such as completely retract, the piston of such a lifting unit while lifting the front main wheel. At the same time, a plurality of lifting units may be used for this process, wherein in particular it is contemplated to distribute the function of a single lifting unit to two or more parallel-connected lifting units.

Moreover, in one or some embodiments, at least one of the lifting units may be inactive when another of the lifting unit(s) apply force to transition the front main wheel of a particular track drive from its home position into its lifted position. Specifically, lifting unit(s) that is/are oriented at least substantially vertically and to which centrifugal forces are applied while cornering the respective harvester, may be rendered inactive when another of the lifting unit(s) apply force to transition the front main wheel of a particular track drive from its home position into its lifted position. A load on the lifting unit caused thereby may be so pronounced that its use, especially extending the particular piston from the associated cylinder, becomes much more difficult. Deactivating such a lifting unit while lifting the front main wheel may thus be performed. This deactivation of the lifting unit(s) may be performed by temporarily disconnecting the particular lifting unit(s) from a common hydraulic system to which at least a plurality of existing lifting units, such as one, some or all lifting units, are connected. Such a disconnection may occur at least partly (such as for the duration) of a particular lifting process.

In one or some embodiments, lifting the front main wheel is automatically triggered depending on a steering angle of the harvester, such as depending on a steering angle of a steering wheel of the harvester. An upper limit steering angle at which, upon being exceeded, the front main wheel is lifted, is a maximum 20° (e.g., at least 20°), such as a maximum 17.5° (e.g., at least 17.5°), or such as a maximum 15° (e.g., at least 15°), in comparison to zero steering at which, when set, the harvester drives straight. In one or some embodiments, the automatic lifting of the front main wheel of the particular track drive is not triggered for each steering angle, in particular not for a very slight steering angle. For example, there may be momentary instances where the steering angle may exceed the upper limit steering angle. In particular, it may be routine for at least small course corrections to be made by the operator, or automatically as well, while traversing a particular working strip of the work field that displaces the harvester from a completely and exactly straight lane. In one or some embodiments, such small steering corrections do not directly cause the control device to cause lifting of the front main wheel of the track drive. The control device may restrict control responsive to significant steering movements, especially a particular turning maneuver in the region of a headland of a work field. Such a turning maneuver is distinguished from routine course corrections while processing a working strip by the strong amount of the deviating steering angle of the particular steering wheel. Thus, the control device is configured to cause automated lifting of the front main wheel dependent on exceeding a certain steering angle limit, which is assumed to be a significant amount. In particular, damage to the work field may only be anticipated in those cases in which such a steering angle limit is exceeded.

To the extent that the lifting of the front main wheel is triggered depending on a steering angle, it can be particularly advantageous if said lifting is only triggered when the steering angle exceeds the upper limit steering angle for at least the duration of a predefined threshold time period, wherein the duration of the predetermined threshold time period may comprise at least 2 seconds, at least 3 seconds, or some other predetermined threshold time period. In this way, in one or some embodiments, the control device may monitor exceeding in at least two respects, including whether the steering angle exceeds the upper limit steering angle and whether the amount of time that the steering angle exceeds the upper limit steering angle exceeds the predefined threshold time period. Thus, exceeding the limit steering angle very briefly (e.g., less than the predefined threshold time period) does not trigger the control device to command the lifting of the front main wheel.

Analogous to lifting the front main wheel, the front main wheel may also be automatically lowered again depending on the steering angle, wherein a steering angle lower limit which triggers lowering when undershot, is at most 15°, such as at most 13°, or such as at most 11° relative to zero steering (e.g., driving straight ahead). In this case as well, a threshold time period may be provided, the duration of which is to be exceeded before automatic lowering is triggered. In one or some embodiments, the threshold time period for lowering the front main wheels is the same as the threshold time period for lifting the front main wheels. Alternatively, the threshold time period for lowering the front main wheels may be different from the threshold time period for lifting the front main wheels.

Moreover, such a method may be applied to control the harvester when the front main wheel is lifted after fully traversing a last working strip, and is again lowered before starting to traverse the next working strip. In other words, when this method is being executed, the front main wheel of the particular track drive is lifted during the turning maneuver so that the contact surface of the track with the surface of the work field is reduced during the turning maneuver.

In one or some embodiments, the lifting of the front main wheel is triggered at least partially automatically in response to input by the operator operating the harvester. It is contemplated for the front main wheel to be lifted after traversing a working strip without further involvement by the machine driver. It is for example conceivable to equip the harvester with a positioning device, such as a GPS receiver, and to use this data received by this positioning device to automatically control the track drive. In particular, instead or (or in addition to) using the steering angle as trigger to cause lifting/lowering of the front main wheels, the control device may determine, based on a current location of the harvester, whether to cause lifting/lowering of the front main wheels.

Moreover, a procedure may comprise automatically lifting and/or lowering the front main wheel fully depending on at least one operating parameter of the harvester. Various operating parameters of the harvester are contemplated. As one example, steering angle of the harvester may comprise one operating parameter, as discussed above. Alternatively, or in addition, working position of an attachment of the harvester may comprise another operating parameter. In particular, the control device may control the position of the front main wheel dependent on the working position of an attachment of the harvester. The control device may cause lifting of the front main wheel responsive to the control device determining that the attachment has been lifted (with the attachment being lifted, for example, so that the attachment is not harvesting the crop). Still another operating parameter comprises operational state of the harvester (e.g., whether the harvester is processing a crop, such as indicated by a crop inlet region to the harvester). Alternatively, or in addition, position (such as relative or absolute position of the harvester) may comprise yet another operating parameter. In particular, the control device may determine whether to lift the front main wheels depending on the relative and/or absolute position of the harvester on the field. In this regard, the control device may use any one, any combination, or all of steering angle, configuration of the attachment device, operational state of the harvester, or position of the harvester to determine whether to automatically lift and/or lower the front main wheels. Thus, the machine driver may be relieved from monitoring the track drive with respect to lifting and lowering the front main wheel thereof.

Moreover, in one or some embodiments, the front main wheel may be lowered at least partially automatically before traversing a working strip to be processed next in response to input by the machine driver operating the harvester. Such a method may comprise fully automatically lowering the front main wheel depending on at least one operating parameter of the harvester. As discussed above, the control device may use one or more operating parameters to determine whether to lower the front main wheel. For example, the control device may use the relative and/or absolute position of the harvester on the work field as an operating parameter in order to determine whether to lower the front main wheel. Alternatively, or in addition, linking the working position of the attachment and/or a measured throughput in an inlet region of the harvester is also contemplated. The latter, focusing on the inlet region of the harvester, may be based on the consideration that the front wheel of the particular track drive should be lowered in the event that the harvester is in harvesting mode and is processing a crop. Using this procedure, lowering the front main wheel of the track drive may not be unintentionally forgotten, thereby allowing for the bottom section of the track of the track drive is again in contact with the surface of the work field by its full contact surface while traversing the next working strip.

To further automate the entire turning maneuver of the harvester, such a method is furthermore contemplated whereby the turning maneuver is executed at least partially automatically in response to input by the operator operating the harvester. In this case, both the lifting of the front main wheel of the track drive as well as the execution of the turning maneuver per se (e.g., such as steering the harvester) and/or lowering the front main wheel before traversing the next working strip are executed without the involvement of the machine driver. It is contemplated for the machine driver to activate the automatic turning maneuver after reaching an end of a particular working strip by actuating a switch, during which the front main wheel of the particular track drive is first automatically lifted and then again lowered.

Such an automated turning maneuver may be executed fully automatically, namely depending on at least one operating parameter of the harvester, such as depending on the harvester's relative and/or absolute position on the work field. It is then unnecessary for the operator to manually initiate the turning maneuver. Fully automated lifting of the front main wheel before driving on a public road is also contemplated.

Referring to the figures, FIG. 1 illustrates a harvester 1 according to one embodiment through which the crop 2 can be harvested. Various types of harvesters are contemplated. As one example, harvester 1 may comprise a field harvester. To harvest the crop 2, the harvester 1 has an attachment 31 with a feed section 32, a conveying unit 3, a chopping unit 4 and an ejection unit 5. Using the conveying unit 3, the crop 2 is conveyed toward the chopping unit 4 where it is chopped by the chopping unit 4 and then conveyed toward the ejection unit 5 which throws the crop 2 onto a transport container (not shown in the figures).

The harvester 1 according one or more embodiments comprises at least two axels (such as a total of two axles), including a front axle and a rear axle. The harvester 1 interacts on both sides of the front axle with one or both of track drives 6. The harvester 1 has typical round wheels on the rear axle that are designed as steering wheels 14. As such, the steering wheels 14 are designed to rotate about a vertical axis so that the harvester 1 may be commanded to change the driving direction (e.g., the harvester 1 may be steered).

The track drives 6 each have two main wheels 7, 8, wherein one main wheel 7 (interchangeably termed a front main wheel) is arranged further to the front viewed relative to the other main wheel 8 (interchangeably termed a rear main wheel), and viewed in the driving direction of the harvester 1. Moreover, each of the track drives 6 has two auxiliary wheels 9 that are arranged between the main wheels 7, 8, and whose diameter is significantly less than that of the main wheels 7, 8 (e.g., whose the radius of auxiliary wheels being less than half of the radius of the main wheels 7, 8). Furthermore, each of the track drives 6 has a circulating track 10 that surrounds the outer main wheels 7, 8. The track 10 has a bottom section 11 with which it may come into direct contact with a surface 25 of a particular field 19 (such as an agricultural field or a work field). The auxiliary wheels 9 are arranged or positioned on the particular track drive 6 such that they interact with the bottom section 11 of the track 10 so that a contact surface 26 that the track 10 forms with the surface 25 of the field 19 does not significantly decrease while traveling over an elevation (such as over a mound or an object). In other words, the auxiliary wheels 9 ensure that the track 10 (nearly or fully) continuously presses against the surface 25 of the field 19 and thereby maintains the contact surface 26 to a greater extent (such as a maximum extent as continuously as possible).

Each of the track drives 6 has a track tightening unit 24 through which the two main wheels 7, 8 may be moved relative to each other in a direction parallel to a longitudinal axis 27 of the harvester 1. In this way, it is possible to tighten the track 10 using the track tightening unit 24. In particular, the track tightening unit 24 may interact with an associated control device such that the tension acting on the track 10 is consistently held at a given target value. In one or some embodiments, the associated control device is local or proximate to the track tightening unit 24 and is not shown in the figures. Alternatively, the associated control device may be included or associated with control device 13, with control signals generated by the associated control device being routed wired or wirelessly to the track tightening unit 24 for control of the track tightening unit 24. In one or some embodiments, the track tightening unit 24 may be designed as a piston/cylinder unit, which changes the distance between the main wheels 7, 8 of the track drive 6 depending on the state (such as the current state) of tension of the track 10.

Figure 2:
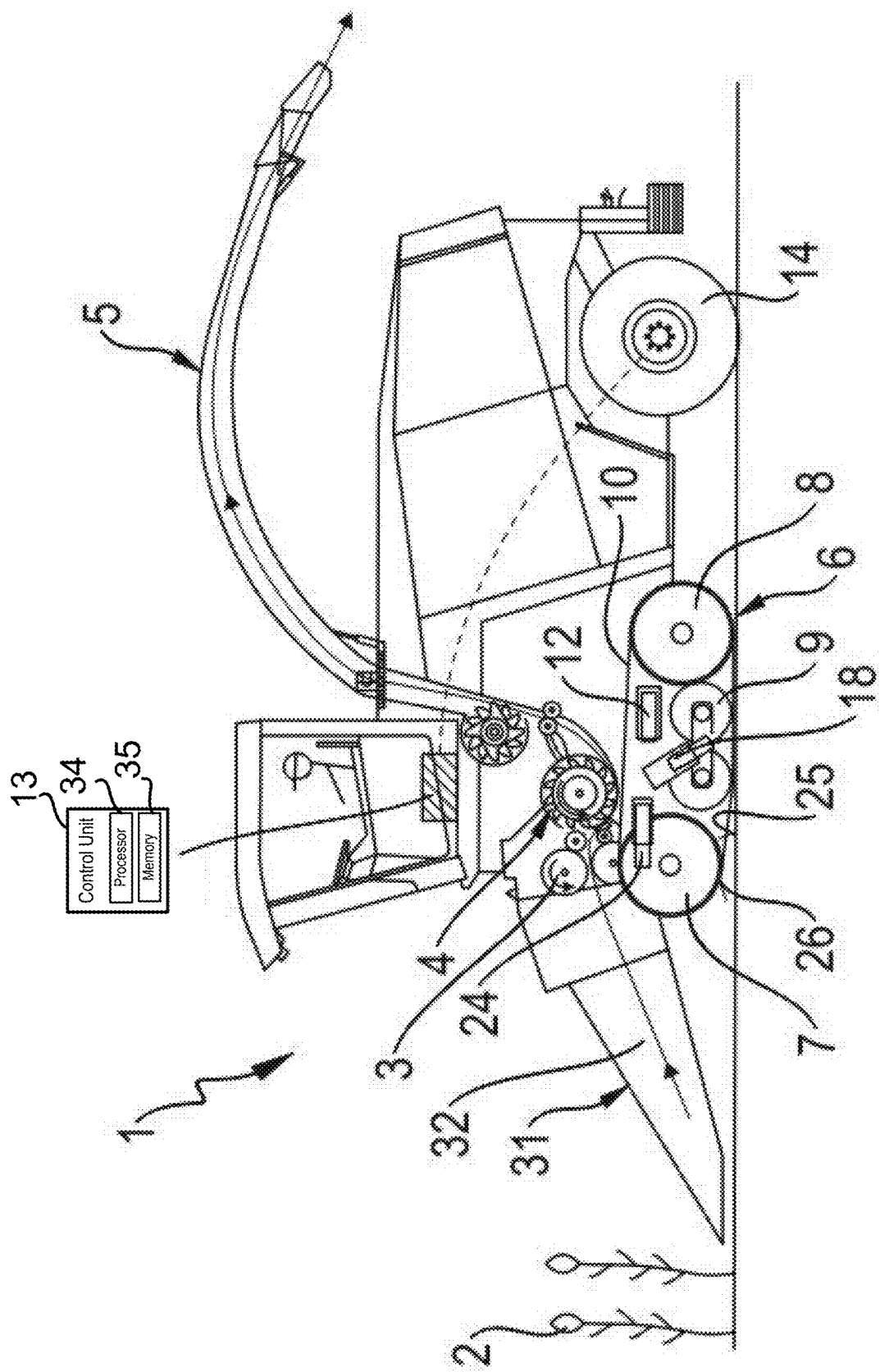
FIG. 2 is the partial cross section in FIG. 1, wherein the track drives are in their lifted position.

In the depicted example, the track drive 6 of the harvester 1, according to one or some embodiments, includes at least two lifting units (such as two lifting units 12, 18). A first lifting unit 12 is primarily provided to transfer the front main wheel 7 of the track drive 6 into its lifted position starting from its home position, as shown in FIG. 1. The lifted position of the front main wheel 7 is illustrated in FIG. 2. It is apparent from FIG. 1 that when the front main wheel 7 is not in the lifted position, the first lifting unit 12 is extended. It is further apparent from FIG. 2 that the first lifting unit 12 is retracted (such as completely retracted) when the front main wheel 7 is not in the lifted position, whereas the second lifting unit 18 is unchanged relative to the state shown in FIG. 1. The second lifting unit 18 in this case is inactive in order to transfer the front main wheel 7 from its home position into its lifted position.

Figure 3:
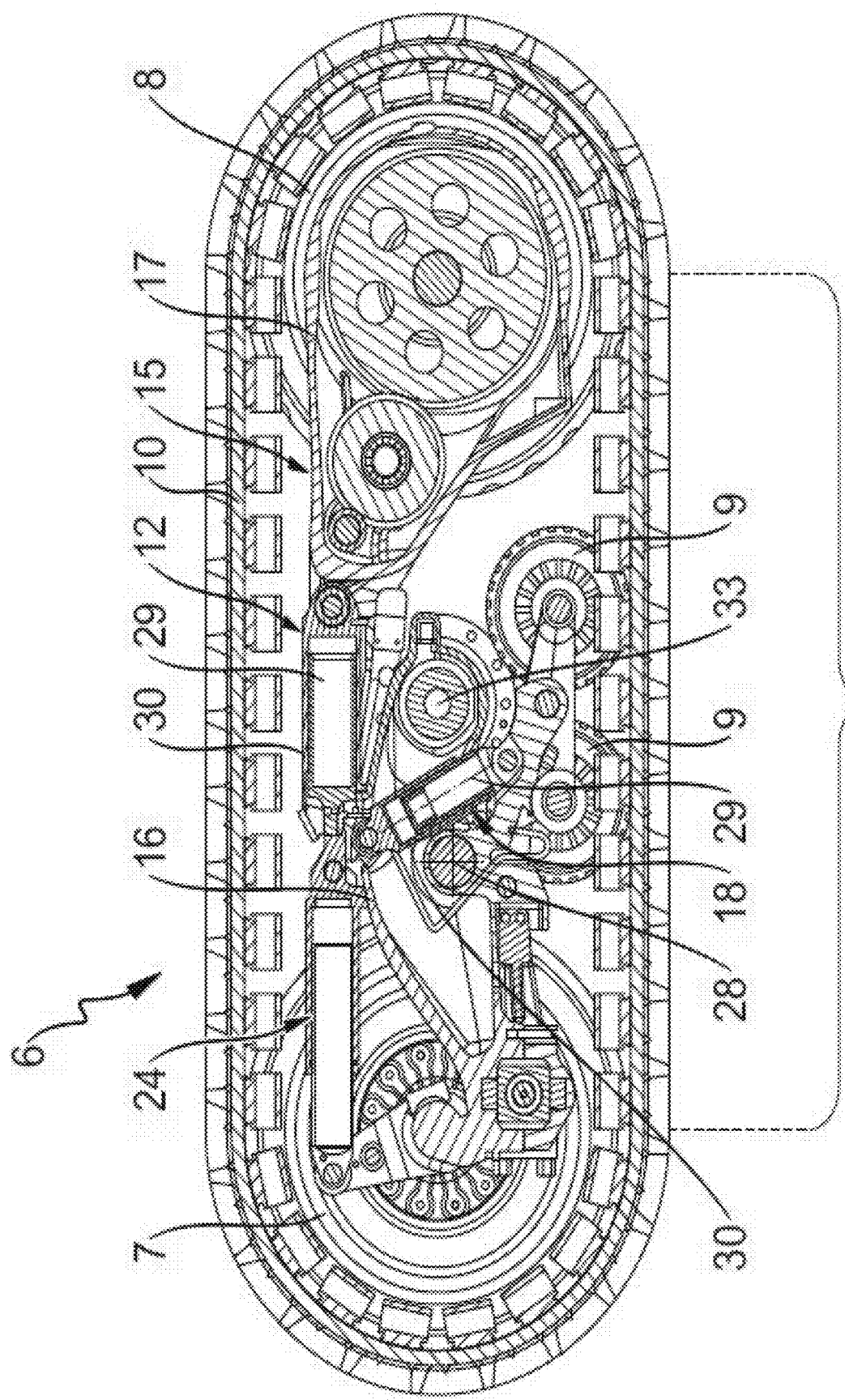
FIG. 3 is a section of a track drive that is in its home position.

Similar to the track tightening unit 24, the lifting units 12, 18 in the shown example are each formed by a piston/cylinder unit. The lifting units 12, 18 each interact with a frame 15 of the associated track drive 6. Frame 15 is illustrated in detail in FIG. 3. Frame 15 comprises at least (or a total of) two frame parts 16, 17, wherein one frame part 16 interacts with the front main wheel 7, and the other frame part 17 interacts with the rear main wheel 8. In this case, the first lifting unit 12 is designed such that its piston 29 is connected to the front frame part 16, and its cylinder 30 is connected to the rear frame part 17. The lifting unit 12 is horizontally aligned in this case. Activating the lifting unit 12 causes opposing exertions of force on the two frame parts 16, 17.

The frame parts 16, 17 are connected to each other in a manner so as to transmit force, wherein this connection is designed such that the frame parts 16, 17 may pivot relative to each other about a swivel axle 28 (defining a first swivel or a first pivot axis) parallel to a pivot axle 33 (defining a second swivel or a second pivot axis) of the harvester 1, wherein the pivot axle 33 describes an additional pivot axis of the particular track drive 6 about which the track drive 6 may pivot as a whole relative to the harvester 1. In one or some embodiments, the pivot axle 33 and the swivel axle 28 are arranged or positioned at a predetermined distance from each other. The swivel axle 28 is formed in a joint or an articulation of the track drive 6.

The lifting unit 12 is designed to be active so that the piston 29, relative to the cylinder, may be actively driven using an applied force. In one or some embodiments, this may be effectuated or implemented by using a hydraulic system (not shown in the figures) by which fluid pressure from hydraulic fluid located within the workspace of the lifting unit 12 may be changed or modified. To accomplish this, the hydraulic system has a hydraulic unit, such as a hydraulic pump. As a result of actuating the lifting unit 12, including its piston 29 and cylinder 30, the two frame parts 16, 17 are moved relative to each other and subsequently pivoted relative to each other about the aforementioned swivel axle 28. Specifically, responsive to actuation of the lifting unit 12, movement of the front frame part 16 occurs, specifically beginning from a home position of the front main wheel 7, by which the front main wheel 7 is lifted from the surface 25 of the field 19 and consequently transferred to its lifted position. In the depicted example, this activation of the lifting unit 12 is therefore associated with its piston 29 being retracted in its cylinder 30. In one or some embodiments, the lifting unit 12 is designed as dual-acting. That is, the piston 29 may be both actively retracted into the cylinder 30 as well as actively extended out of the cylinder 30. In one or some embodiments, the second lifting unit 18 is contrastingly only designed as single-acting, wherein its piston 29 can only be actively extended out of the associated cylinder 30.

In the shown example, the second lifting unit 18 is deactivated while transitioning the front main wheel 7 from the home position into its lifted position. To accomplish this, the second lifting unit 18 is disconnected from the common hydraulic system that controls both lifting units 12, 18. The lifting unit 18 accordingly remains unchanged during the lifting process for the front main wheel 7, whereas the first lifting unit 12 is retracted (such as completely retracted). Alternatively, separate hydraulic systems may be used to control lifting units 12, 18. In that regard, a first hydraulic system may control lifting unit 12 while a second hydraulic system may remain inactive, thereby leaving lifting unit 18 unchanged.

According to the one or some embodiments, the track drives 6 in the shown example may also include the aforementioned second lifting unit 18. Lifting unit 18 interacts in this case with the front frame part 16 and with the auxiliary wheels 9. The lifting unit 18 may also be composed of a piston/cylinder unit, wherein the lifting unit 18 may be aligned at a slight angle relative to the vertical and thus be oriented basically vertically. This is illustrated, for example, in FIG. 3, wherein an angle formed by the lifting unit 18 and by a vertical line is less than 30°, less than 25°, less than 20°, less than 15°, etc. The lifting unit 18 is configured to exert a lifting force on the frame part 16, thereby pivoting the frame part 16 together with the first lifting unit 12 about the swivel axle 28 and thus lifting the front main wheel 7. The lifting force of the lifting unit 18 exerted on the frame part 16 is then exerted into the ground via the auxiliary wheels 9. Activating the lifting unit 18 causes its piston 29 to be moved out of its cylinder 30 so that the entire lifting unit 18 lengthens. As previously described, the lifting unit 18 may be designed single-acting. Retracting the piston 29 into the cylinder 30 while lowering the front main wheel 7 is consequently accomplished solely by the effect of the weight of the front main wheel 7. Alternatively, the lifting unit 18 may be designed as dual-acting.

In the shown example, the lifting unit 18, as described above, is not used to support the first lifting unit 12 in order to lift the front main wheel 7 off the ground. Instead, in one or some embodiments, the lifting unit 18 is temporarily disconnected from the common hydraulic system and thereby deactivated. After the front main wheel 7 has been transferred to the lifted position, the lifting unit 18 may be reconnected to the hydraulic system.

As specifically illustrated in FIG. 2, the lifting of the front main wheel 7 results in a reduction of the contact surface 26 which exists between the track 10 and the surface 25 of the field 19. This reduced contact surface 26 provides the advantage that a rotation of the associated track drive 6 about a vertical axis relative to the surface 25 of the field 19 is associated with a comparatively low (or reduced) application of shearing forces to the field 19. Consequently, in certain operations of the harvester 1, such as in changing direction of the harvester 1, each of the track drives 6 of harvester 1 may its respective front main wheels 7 lifted, which it can be performed with relatively no or little attendant damage (e.g., particularly where there may be less or slight damage to an area of the field 19 close to the surface proximate to where the harvester 1 changes direction).

In the shown example, the lifting unit 18 is configured such that it performs a damping function and accordingly acts as a damping element. As such, the lifting unit 18 may cause a movement, such as a downward movement, of the front main wheel 7 to be dampened while it lowers toward the home position to avoid or reduce the potential for a hard impact by the front main wheel 7 on the surface 25 of the field 19. Various damping elements are contemplated. As one example, the piston 29 of the lifting unit 18 may include a gas chamber within its interior that can function as a gas spring, thereby dampening the downward movement.

Moreover, in one or some embodiments, the lifting unit 12 may be configured to perform a damping function, such as a passive damping function, in addition to its active function to lift the front main wheel 7, thereby act, more or less, as a damping element. This is particularly desirable during normal operation of the harvester 1 since the track 10 lies most on the field 19 in this stage of operation. In the event that a particular track drive 6 travels over an obstacle, the two frame parts 16, 17 pivot relative to each other. This relative movement of the two frame part 16, 17 may then be dampened by the lifting unit 12, in performing its damping function, so that no sudden movements occur.

According to one or some embodiments, the harvester 1 includes a control device 13 that is disclosed in a schematic manner in FIGS. 1 and 2. Control device 13 may comprise any type of computing functionality and may include processor 34 and memory 35. Though processor 34 (which may comprise a microprocessor, controller, PLA or the like) and memory 35 are depicted as separate elements, they may be part of a single machine, which includes a microprocessor (or other type of controller) and a memory unit. The microprocessor and memory unit are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions, which may comprise computer-readable instructions, may implement the functionality described herein and may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described herein or illustrated in the drawings.

The control device 13 interacts or is in communication with the rear steering wheels 14 so that a particular steering angle, which causes a change in direction of the harvester 1 different from straight-ahead travel, may be detected by the control device 13. In one or some embodiments, the control device 13 may furthermore interact, directly or at least indirectly, with the lifting units 12 of the two track drives 6 so that the respective lifting units 12 may be controlled, directly or at least indirectly by the control device 13 (e.g., in one or some embodiments, the control device 13 may control each respective lifting unit 12 of a respective track drive 6 independently of the control of the other respective lifting unit 12 of the other respective track drive 6). In particular, the control device 13 can interact directly with the aforementioned hydraulic system, or with the associated hydraulic unit through which the lifting unit 12 may ultimately be activated.

In one or some embodiments, the control device 13 is configured such that the control device 13 activates the lifting unit 12 depending on a steering angle of the steering wheels 14 such that the front main wheel 7 is transferred into its lifted position starting from its home position, or vice versa. In so doing, the piston 29 of the lifting unit 12 is retracted in its cylinder 30. For example, responsive to the control device 13 receiving data indicative of the steering angle of the steering wheels 14 indicative of a change in driving direction (e.g., indicative of turning of the harvester 1), the control device 13 may command the lifting unit 12 to transfer the front main wheel 7 to its lifted position (e.g., transitioning from its home position). Alternatively, or in addition, responsive to the control device 13 receiving data indicative of the steering angle of the steering wheels 14 indicative of a different change in driving direction (e.g., indicative of straightening out of the harvester 1), the control device 13 may command the lifting unit 12 to transfer the front main wheel 7 to its home position (e.g., transitioning from its lifted position). In one or some embodiments, the activation of the lifting unit 12 by the control device 13 may only occur when the steering angle exceeds a predetermined limit steering angle. The predetermined limit steering angle may, for example, be selected to be 13°, which means that as the control device 13 determines that data indicating a steering angle is more than 13°, the control device 13 may automatically (e.g., without further intervention by the machine driver) cause or command, via the lifting unit 12, the front main wheel 7 to lift so that the desired cornering of the harvester 1 can proceed with less or as little damage as possible to the field 19. Alternatively, or in addition, responsive to the control device 13 determining that data indicating a steering angle is less than 13°, the control device 13 may automatically cause or command, via the lifting unit 12, the front main wheel 7 to return to its home position in order to return to normal operation. In this manner, automated control of the transference of the front main wheel 7 between its positions is feasible. In the depicted example, the lifting and/or reverting to normal operation is nonetheless only triggered when the described limit steering angle is exceeded for a duration that exceeds the duration of a predetermined threshold time period. As one example, the predetermined threshold time period may be selected to be 0.5 seconds. Other predetermined threshold time period are contemplated.

Figure 4:
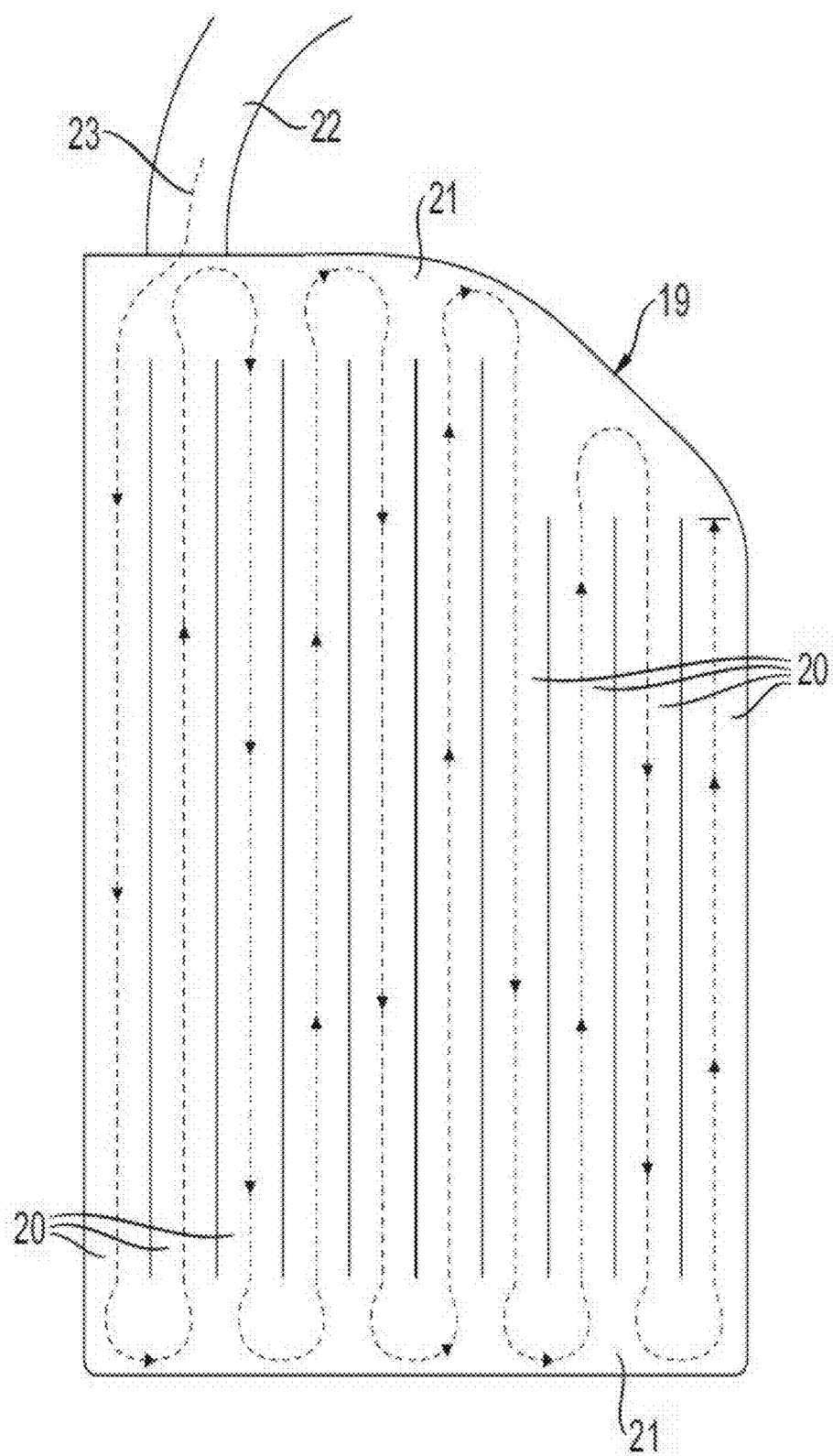
FIG. 4 is a plan view of a work field that is divided into a plurality of working strips.

With reference to the representation according to FIG. 4, an example of a work process is depicted for processing or harvesting a field 19 using the harvester 1 according to one or some embodiments. The harvester 1 first enters the field 19 by way of a country road 22. On the field 19, the harvester 1 moves along a lane 23 represented in FIG. 4 by a dashed line. In order to process or harvest the field 19 as efficiently as possible, the field 19 may be divided into individual driving lanes 20 that are arranged at least substantially parallel to each other and run intrinsically straight. In order to be able to reach the next driving lane 20 after completely processing a particular driving lane 20, the harvester 1 executes a turning maneuver in the region of a headland 21 of the field 19. Of course, executing this turning maneuver is routinely associated with the harvester 1 traveling a comparatively tight curve. According to the above explanation, this may result in potential damage to a region of the field 19 close to the surface. Such damage may be particularly disadvantageous for grass fields.

According to one or some embodiments, to reduce this potential damage during the turning maneuver, the front main wheels 7 of one or both track drives 6 of the harvester 1 are lifted from the field 19 during the turning maneuver in order to reduce the contact surface 26 between the track 10 and the surface 25 of the field 19. This may reduce shearing forces on the field 19, which may, in turn, reduce the damage to the field 19. The front main wheel 7 may be lifted automatically using the control device 13. As described above, control device 13 may control lifting of the front main wheel 7 via lifting unit 12 depending on one or more criteria associated with operation of the harvester 1. For example, control device 13 may control lifting of the front main wheel 7 depending on the steering angle of the harvester 1. In this regard, according to one or some embodiments, control device 13 may operate automatically in lifting and/or reverting to normal operation of the front main wheel 7, so that the driver of the harvester 1 need not actively control the harvester 1.

LIST OF REFERENCE SIGNS

1 Harvester
2 Crop
3 Conveying unit
4 Chopping unit
5 Ejection unit
6 Track drive
7 Front main wheel
8 Rear main wheel
9 Auxiliary wheel
10 Track
11 Bottom section of the track
12 Lifting unit
13 Control device
14 Steering wheel
15 Frame
16 Frame part
17 Frame part
18 Lifting unit
19 FIELD
20 Working strip
21 Headland
22 Country road
23 Lane
24 Track tightening unit
25 Surface of the work field
26 Contact surface of the track
27 Longitudinal axis of the harvester
28 Pivot axle
29 Piston
30 Cylinder
31 Attachment
32 Feed section
33 Pivot axle
34 Processor
35 Memory

The invention claimed is:

1. A harvester configured to harvest a crop from a field, the harvester comprising:
   at least two track drives positioned on opposite ends of an axle of the harvester, each of the at least two track drives comprising:
      at least two main wheels positioned sequentially in a direction of driving of the harvester, the at least two main wheels comprising a front main wheel and a rear main wheel;
      at least one auxiliary wheel positioned between the at least two main wheels; and
      at least one track surrounding the at least two main wheels, wherein the auxiliary wheel is configured to interact with a bottom section of the at least one track so that forces to be deflected via a respective track drive into ground are deflected at least partly by the auxiliary wheel;
   at least one lifting unit positioned relative to each of the at least two track drives, the at least one lifting unit configured to generate a force to move the front main wheel of the respective track drive from a home position to a lifted position; and
   a control device configured to:
      determine a direction of the harvester; and
      automatically control, via the at least one lifting unit and based on the determined direction of the harvester, a position of the front main wheel of at least one of the at least two track drives.

2. The harvester of claim 1, wherein the control device is configured to:
   receive data indicative of a steering angle of the harvester;
   determine, based on the data indicative of the steering angle, the steering angle of the harvester; and
   automatically initiate, based on the determined steering angle of the harvester, lifting of the front main wheel of each respective track drive from the home position to the lifted position.

3. The harvester of claim 2, wherein the at least one lifting unit comprises an extended position and a retracted position;
   wherein responsive to the at least one lifting unit being in the extended position, the front main wheel is in its home position; and wherein responsive to the at least one lifting unit being in the retracted position, the front main wheel is in its lifted position.

4. The harvester of claim 1, further comprising a common hydraulic system;
wherein the at least one lifting unit for each of the at least two track drives is driven by the common hydraulic system;
wherein at least one of the at least two track drives includes the at least one lifting unit configured to generate the force to move the front main wheel from the home position to the lifted position and a second lifting unit; and
wherein the control device is configured to command the common hydraulic system to temporarily disconnect from the second lifting unit at least partly while the common hydraulic system drives the at least one lifting unit in order for the at least one lifting unit to generate the force to move the front main wheel from the home position to the lifted position.

5. The harvester of claim 4, wherein the at least one lifting unit is substantially horizontal; and
wherein the second lifting unit is vertical or substantially vertical.

6. The harvester of claim 5, wherein the at least one lifting unit and the second lifting unit are hydraulically controllable independently.

7. The harvester of claim 4, wherein the at least one lifting unit and the second lifting unit comprise piston/cylinder units.

8. The harvester of claim 7, wherein the piston of the at least one lifting unit is configured to both actively extend out of its associated cylinder and actively retract into the associated cylinder.

9. The harvester of claim 1, wherein the at least two track drives are positioned on opposite ends of a front axle;
wherein each of the at least two track drives have a two-part frame comprising two frame parts;
wherein each of the at least two track drives include one of the at least two main wheels positioned on one of the two frame parts of the two-part frame;
wherein the two frame parts are connected to each other in a manner so as to transmit force, and relative to each other in order to pivot about a swivel axle parallel to the front axle of the harvester;
wherein the at least one lifting unit is configured to pivot the two frame parts relative to each other; and
wherein the pivoting of the two frame parts results in a transference of the front main wheel of the respective track drive between the home position and the lifted position.

10. The harvester of claim 9, wherein the at least one lifting unit is configured to interact with the two frame parts such that a lifting force acts in an opposite direction on the two frame parts.

11. A method for processing a field using a harvester, the method comprising:
using the harvester to traverse the field sectionally in work strips in order to harvest crop in the field, the harvester comprising:
at least two track drives positioned on opposite ends of an axle of the harvester, each of the at least two track drives including at least two main wheels positioned sequentially in a direction of driving of the harvester, the at least two main wheels comprising a front main wheel and a rear main wheel, and at least one auxiliary wheel positioned between the at least two main wheels; and
at least one track surrounding the at least two main wheels, wherein the auxiliary wheel is configured to interact with a bottom section of the at least one track so that forces to be deflected via a respective track drive into ground are deflected at least partly by the auxiliary wheel;
determining a direction of the harvester; and
automatically lifting, based on the direction of the harvester and using at least one lifting unit, a position of the front main wheel of each respective track drive from a home position to a lifted position in order to reduce contact area between the front main wheel and ground.

12. The method of claim 11, wherein determining the direction of the harvester comprises determining a steering angle of the harvester; and
wherein the automatic lifting of the position of the front main wheel to the lifted position is dependent on the steering angle of the harvester.

13. The method of claim 12, wherein the automatic lifting of the position of the front main wheel to the lifted position is responsive to determining that the steering angle of the harvester is greater than a steering angle upper limit for at least a certain amount of time.

14. The method of claim 13, wherein the steering angle upper limit comprises at least is 15°.

15. The method of claim 13, further comprising, after lifting the front main wheel to the lifted position, determining, based on the steering angle of the harvester, to lower the main front wheel to the home position.

16. The method of claim 15, wherein determining to lower the front main wheel to the home position is responsive to determining that the steering angle is less than a steering angle lower limit for at least a threshold time period.

17. The method of claim 15, wherein the at least one lifting unit moves from an extended position and a retracted position;
wherein responsive to the at least one lifting unit being in the extended position, the front main wheel is in its home position; and
wherein responsive to the at least one lifting unit being in the retracted position, the front main wheel is in its lifted position.

18. The method of 15, wherein the at least one lifting unit comprises a first lifting unit and a second lifting unit;
wherein the first lifting unit generates force to move the front main wheel to its home position; and
wherein the second lifting unit does not generate any force to move the front main wheel to its home position.

19. The method of claim 18, wherein the first lifting unit and the second lifting unit are connected to a common hydraulic system to independently drive the first lifting unit and the second lifting unit; and
wherein the second lifting unit is disconnected from the common hydraulic system prior to the common hydraulic system controlling the first lifting unit to provide the force to move the front main wheel to its home position.

20. The method of claim 11, wherein the harvester moves in an area of the field at least sectionally along work strips;
wherein after the harvester traverses a respective working strip, the harvester executes a turning maneuver in a region of a headland of the area and then begins traversing a next-to-be-processed working strip; and wherein during the turning maneuver, the front main wheel of each of the at least two track drives is automatically lifted.

\* \* \* \* \*